No. 762,872. PATENTED JUNE 21, 1904.
N. A. BERNER.
PIPE JOINT FOR FLOATING DRY DOCK PONTOONS.
APPLICATION FILED NOV. 7, 1903.
NO MODEL.
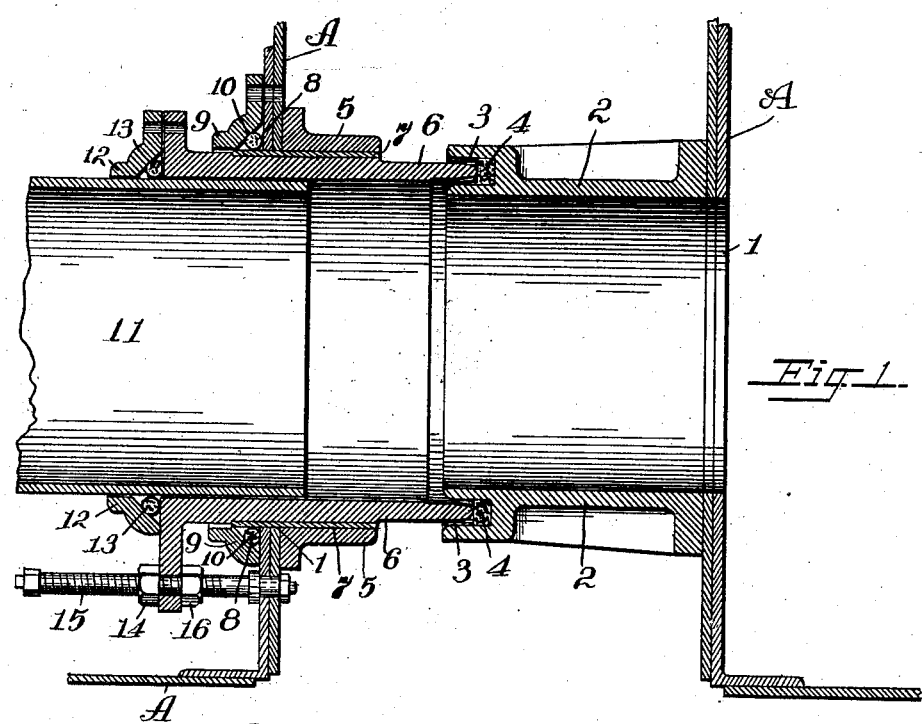
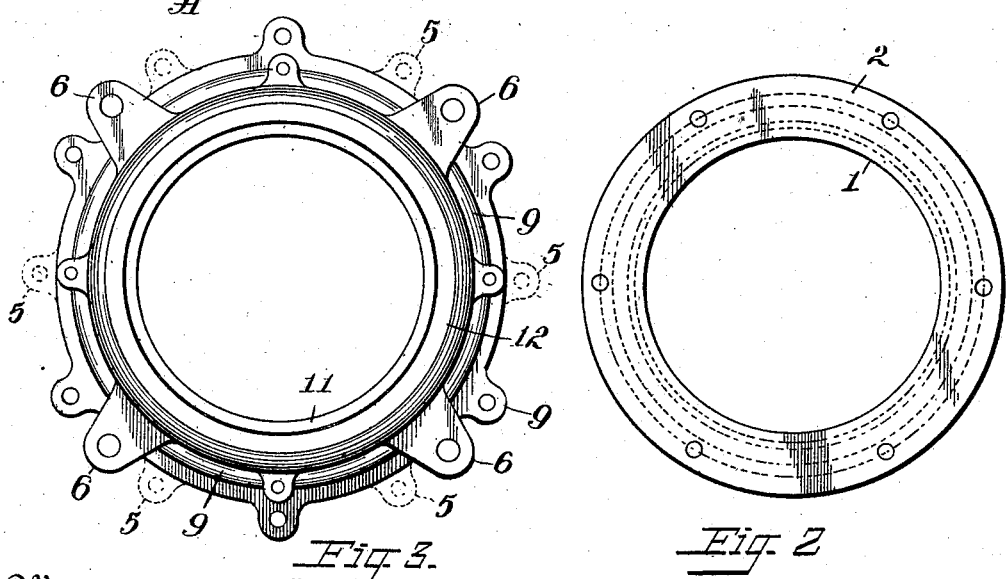
Witnesses
Milton Lenoir
Ralph S. Warfield
Inventor
Nils Anton Berner
by H. S. Brewington
Attorney No. 762,872.

Patented June 21, 1904.

UNITED STATES PATENT OFFICE.

NILS ANTON BERNER, OF SPARROWS POINT, MARYLAND.

PIPE-JOINT FOR FLOATING-DRY-DOCK PONTOONS.

SPECIFICATION forming part of Letters Patent No. 762,872, dated June 21, 1904.

Application filed November 7, 1903. Serial No. 180,204. (No model.)

*To all whom it may concern:*

Be it known that I, NILS ANTON BERNER, a citizen of the United States, residing at Sparrows Point, in the county of Baltimore and State of Maryland, have invented certain new and useful Improvements in Pipe-Joints for Floating-Dry-Dock Pontoons, of which the following is a specification.

My invention relates to an improvement in pipe connections between pontoons for floating dry-docks, the object being to connect the pipes under water in an air and water tight joint that can be operated without overheeling the dock. This construction will save much time and labor in connecting and disconnecting the pontoons, and it also saves money and material for reinforcements necessary in a dock constructed for overheeling.

With these objects in view my invention comprises a connection having waterproof-joints; and it consists in details of construction and combinations of parts which will be hereinafter described, and pointed out in the claims.

In the accompanying drawings, Figure 1 is a vertical section through the joint or connection, and Figs. 2 and 3 are end views of the joint.

A A represent pontoon-walls, which may be constructed in the usual manner. The one to the left may represent an end pontoon and the one to the right a center pontoon. The usual openings 1 1 are provided in the pontoon-walls at points opposite each other. A cast-iron box 2 2 is securely bolted to the center pontoon in alinement with the opening 1, this box preferably being radially ribbed to give it strength and provided at its outer end with an annular groove 3, in which is held a rubber packing 4, this portion of the joint or connection constituting the female member.

A cast-iron sleeve 5 is bolted or otherwise secured around the opening 1 in the end pontoon, so that it projects in the direction of the center pontoon. A gland 6 extends through the opening 1 and sleeve 5 of the end pontoon, and this gland tapers slightly, and between it and the bore of the sleeve and the opening 1 a brass bushing 7 is screwed or otherwise fastened to the gland 6 to prevent the gland 6 and the sleeve 5 from rusting together and at the same time, by giving the gland larger diameter, prevent barnacles and dirt on the outer part of the gland to interfere with its motion.

A rubber packing-ring 8 is clamped securely in place at the joint between the opening 1 and the brass bushing 7 by means of a metal ring 9, which latter is bolted or otherwise secured to the wall of the pontoon, the inclining inner surface 10 of this ring serving to compress the rubber packing-ring 8 and form a tight joint. The pipe 11 is similarly packed in the gland by means of a metal ring 12 and rubber packing-ring 13, held in place by bolts extending into the flange of the gland 6. The outer end of gland 6 is forced against the rubber packing-ring 4 of the female section of the joint by nuts 14 on the bolts 15, the bolts being held securely in the wall of the pontoon. The nuts 16 on the bolts 15 are for backing the gland 6.

On each side of the joint or connection the pipe-line is provided with a valve placed inside in each pontoon, and by these valves the water is kept out of the pipes when the joint is disconnected. In this way an air and water tight joint is formed for the pipes, and the connection or joint thus formed is of few parts, easily assembled and held in place, thus saving time and expense in the coupling up and construction of the parts and at the same time affording an effectual joint between the adjacent pontoons.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with two pontoons, of a joint or connection comprising a male and female gland, one of which is adjustable.

2. The combination with two pontoons, of a joint or connection comprising a male and female gland, one of which is adjustable, and packing held between the joints of the connection whereby to render them waterproof.

3. The combination with two pontoons having openings therein and sleeves surrounding these openings, one of which sleeves has a groove therein, with a packing-ring held in said groove, of a gland adjustably supported in the other opening and means for packing the joints water-tight.

4. The combination with two pontoons having openings therein and sleeves surrounding these openings, one of which sleeves has a groove therein, with a packing-ring held in said groove, of a gland adjustably supported in the other opening, a pipe extending into the gland and means for packing the joints water-tight.

In testimony whereof I have signed my name to this specification in presence of two witnesses.

NILS ANTON BERNER.

Witnesses:
E. WALTON BREWINGTON,
W. N. FINLEY.